Nov. 25, 1952 F. W. HOTTENROTH 2,618,977
PRESSURE GAUGE
Filed March 6, 1948
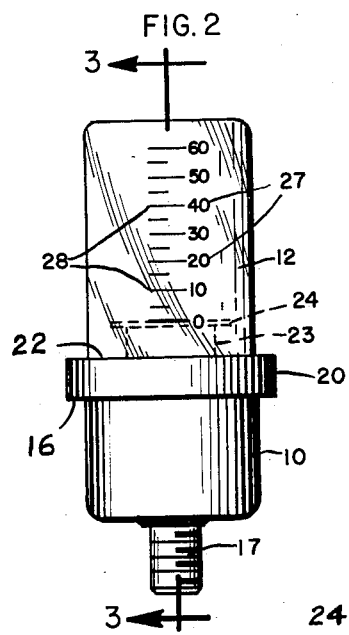
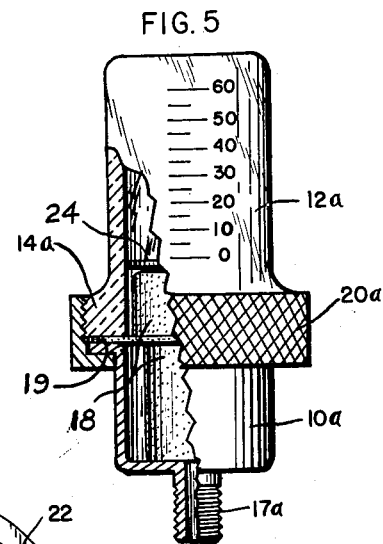
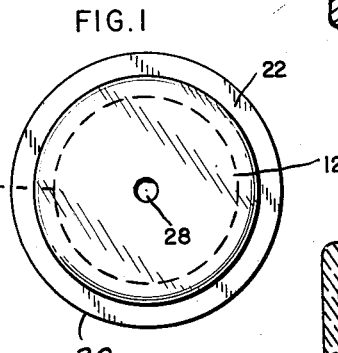
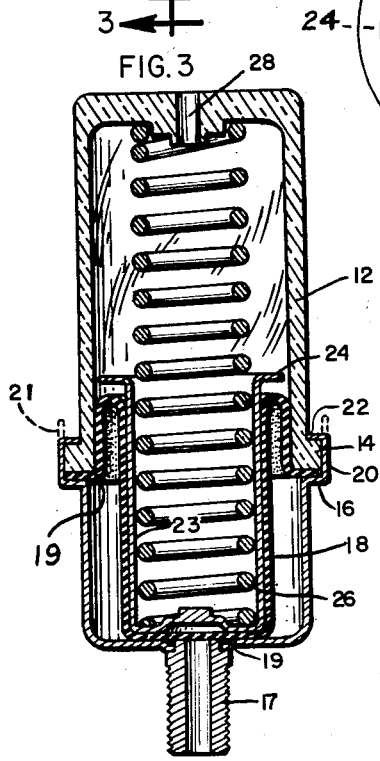
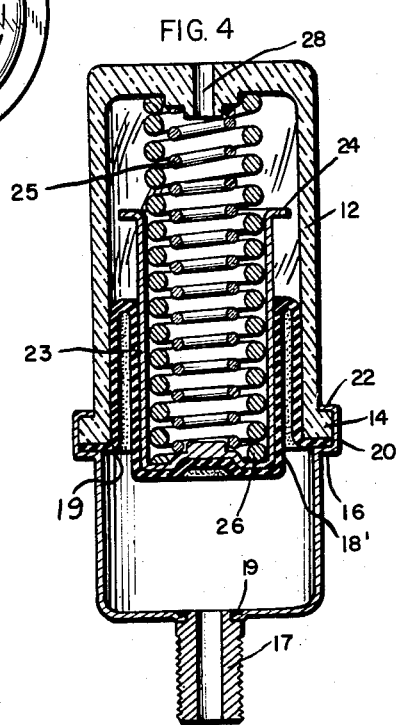
INVENTOR
FREDERICK W. HOTTENROTH
BY *Bair & Freeman*
ATTORNEYS Patented Nov. 25, 1952

2,618,977

UNITED STATES PATENT OFFICE 2,618,977

PRESSURE GAUGE

Frederick W. Hottenroth, Goshen, Ind., assignor to Penn Controls, Inc., a corporation of Indiana Application March 6, 1948, Serial No. 13,470

4 Claims. (Cl. 73—409)

This invention relates to a pressure gauge which is comparatively simple in construction and inexpensive to manufacture.

One object of the invention is to provide a pressure gauge which eliminates the necessity of using a relatively expensive Bourdon tube and substitutes in place thereof a pressure chamber having a diaphragm which constitutes a movable wall of the pressure chamber, the diaphragm moving a tubular indicator against the action of a spring, and the indicator traveling in a transparent tubular housing so as to cooperate with graduations on the housing to indicate the pressure.

Another object is to provide a pressure gauge in which the metal parts thereof may be inexpensively formed of sheet metal stampings and the housing formed of molded transparent plastic or the like, the assembly of the parts together being comparatively simple and involving but a single operation.

Still another object is to provide a pressure gauge housing formed of two parts which are sealed in relation to each other and in relation to a diaphragm by utilizing the periphery of the diaphragm as a gasket between the parts.

Still a further object is to provide a cup-like diaphragm which is so associated with a housing and a spring seat element that it turns wrong-side-out during the motion of the spring seat, the spring seat acting as an indicator and, together with the housing, acting as a support for the diaphragm as it is manipulated by the increase and decrease of pressure in a pressure housing of the pressure gauge.

With these and other objects in view, my invention consists in the construction, arrangement and combination of the various parts of my pressure gauge whereby the objects contemplated are attached, as hereinafter more fully set forth, pointed out in my claims and illustrated in the accompanying drawings, wherein:

Figure 1 is a plan view of the pressure gauge embodying my invention.

Figure 2 is a side elevation thereof.

Figure 3 is a vertical sectional view on the line 3—3 of Figure 2.

Figure 4 is a similar sectional view showing the gauge at a high-pressure position as distinguished from the initial no-pressure position of Figure 3, and Figure 5 is a side elevation, partly in section, showing a modified construction.

On the accompanying drawing I have used the reference numeral 10 to indicate a pressure housing and 12 an indicator housing. The housing 10 is preferably of sheet metal, for economy and ease of manufacture, whereas the housing 12 is made of transparent material, molded plastic being quite suitable and relatively inexpensive in quantity production.

The housings 10 and 12 have out-turned flanges 14 and 16, respectively, between which the periphery of a diaphragm 18 is positioned. The flange 16 has a tubular extension 20 surrounding the periphery of the diaphragm 18 and the flange 14. The extension, being formed of sheet metal, is readily bent inward from the position shown dotted at 21 in Figure 3 to the final position shown by full lines at 22. The bending of the extension 21 to the final position at 22 may be accomplished by the operation of spinning, and is also referred to as coining. This coining operation is done with the parts under pressure to compress the periphery of the diaphragm 18 to effect a seal between the diaphragm and the pressure housing 10 and provide a permanent assembly.

The diaphragm 18 is made of resilient, flexible material such as rubber, neoprene, or the like so that it effectively acts as a seal between the parts 10 and 12 and may be readily actuated for pressure indicating purposes as will hereinafter appear. A pressure connection is made with the housing 10 in any suitable manner such as by means of a nipple fitting 17 soldered at 19. The fitting 17 is connected to any pressure producing means such as the air head in a water supply tank for communicating the pressure therein to the pressure chamber 10 so as to act on the diaphragm 18.

Within the diaphragm 18, a spring seat 23 of deep cup shape is provided, having a guide flange 24 slightly smaller than the internal diameter of the indicator housing 12. A spring 26 is fitted in the seat 23 and rests against the top of the housing 12. For higher pressures a second spring 25 can also be provided as in Figure 4.

The housing 12 is vented to atmosphere as by means of a hole 28. Suitable indicia and graduations are provided by molding them on the indicator housing as shown in Figure 2 at 27 and 28 to cooperate with the flange 24 for pressure indicating purposes.

*Practical operation*

In the operation of my pressure gauge, assuming the parts to be in the initial position of Figure 3, the spring 26 is preferably fully expanded so that the flange 24 of the spring seat 22 cooperates with the scale and indicia 27 and 28 on the spring housing 12 to indicate a pressure of zero pounds per square inch.

If the pressure rises in the chamber 10, it will act on the diaphragm 18 in opposition to the spring 26, thereby raising the spring seat 22 to a higher pressure position such as shown in Figure 4, the wall of the diaphragm turning wrong-side-out, as illustrated. The turning action is progressive and at all positions the pressure between the folded vertical walls of the diaphragm tends to keep them against the inner surface of the housing 12 and the outer surface of the spring seat 22, respectively. Thus the diaphragm is at all times supported against the pressure in the housing 10 with a minimum of resistance of the diaphragm to movement as produced by a change of pressure within the housing 10.

The structure is obviously quite simple and utilizes a minimum of materials and assembly time of the workman. Instead of the sheet metal construction of Figure 4, a cast brass housing 10a with an integral nipple 17a can be provided. A flanged nut 20a screws on a thread flange 14a of a slightly different type of indicator housing 12a to assemble this form of the invention. Otherwise the internal parts are substantially the same and operation is the same.

Some changes may be made in the construction and arrangement of the parts of my device without departing from the real spirit and purpose of my invention, and it is my intention to cover by my claims any other modified forms of structure or use of mechanical equivalents which may be reasonably included within their scope.

I claim as my invention:

1. In a pressure gauge, a tubular pressure housing, a tubular indicator housing, said housings each having a transverse wall at one end and being open at the other end, said open ends facing each other, an out-turned flange formed adjacent the open end of each housing, a cup-shaped diaphragm within said housings, said diaphragm having its peripheral edge positioned between said out-turned flanges, means for clamping the out-turned flanges and the diaphragm edge therebetween together, a cup-shaped spring seat in said housings, said cup-shaped spring seat having a spring positioned therein extending between the bottom of said cup-shaped seat and the transverse end wall of said indicator housing, said spring seat being adapted for reciprocal movement within said housings, said diaphragm following the inner tubular wall of said indicator housing, returning upon itself to follow the outer wall of said cup-shaped spring seat and cover the end thereof, the open end of said cup-shaped spring seat having an out-turned guide flange formed thereon and adapted to cooperate with the inner wall of said housings to position said spring seat substantially concentrically within said housings, and said indicating housing being vented to atmosphere.

2. In a pressure gauge, a tubular pressure housing, a transparent tubular indicator housing having indicia thereon, said housings each having an end wall at one end and being open at the other end, said open ends facing each other, an out-turned flange formed adjacent the open end of each housing, a cup-shaped diaphragm within said housings, said diaphragm having its peripheral edge positioned between said out-turned flanges, means for clamping the out-turned flanges and the diaphragm edge therebetween together, a cup-shaped spring seat in said housings, said cup-shaped spring seat having a spring positioned therein extending between the bottom of said cup-shaped seat and the end wall of said indicator housing, said spring seat being adapted for reciprocal movement within said housings, said diaphragm following the inner tubular wall of said indicator housing, returning upon itself to follow the outer wall of said cup-shaped spring seat and cover the end thereof, and the open end of said cup-shaped spring seat having an out-turned guide flange formed thereon and adapted to cooperate with the inner wall of said housings, said guide flange cooperating with indicia on the indicator housing to indicate pressure.

3. In a pressure gauge, a tubular pressure housing, a tubular indicator housing, said housings each having an end wall at one end and being opened at the other end, said open ends facing each other, an out-turned flange formed adjacent the open end of each housing, a cup-shaped diaphragm within said housings, said diaphragm having its peripheral edge positioned between said out-turned flanges, the flange on one of said housings having a portion extending therefrom adapted to be coined over the flange on the other housing, whereby the flanges of the housing and the diaphragm edge therebetween are clamped together, a cup-shaped spring seat in said housings, and said cup-shaped spring seat having a spring positioned therein extending between the bottom of said cup-shaped seat and the end wall of said indicator housing, said spring seat being adapted for reciprocal movement within said housings, said diaphragm following the inner tubular wall of said indicator housing, returning upon itself to follow the outer wall of said cup-shaped spring seat and cover the end thereof.

4. In a pressure gauge, a tubular pressure housing, a tubular indicator housing, said housings each having an end wall at one end and being open at the other end, said open ends facing each other, a cup-shaped diaphragm within said housings, said diaphragm having its peripheral edge positioned between the open ends of said housings, means for clamping the housings and the diaphragm edge there-between together, a cup-shaped spring seat in said housings, said cup-shaped spring seat having a spring positioned therein extending between the bottom of said cup-shaped seat and the end wall of said indicator housing, said spring seat being adapted for reciprocal movement within said housings, said diaphragm following the inner tubular wall of said indicator housing and returning upon itself to follow the outer wall of said cup-shaped spring seat and cover the end thereof, and the open end of said cup-shaped spring seat having an out-turned guide flange formed thereon and adapted to cooperate with the inner wall of said housings to position said spring seat substantially concentrically within said housings.

FREDERICK W. HOTTENROTH.

REFERENCES CITED

The following references are of record in the file of this patent:

UNITED STATES PATENTS

| Number | Name | Date |
| --- | --- | --- |
| 1,265,676 | Klump | May 7, 1918 |
| 1,626,294 | McPherson | Apr. 26, 1927 |
| 2,225,674 | West | Dec. 24, 1940 |
| 2,225,675 | West | Dec. 24, 1940 |
| 2,417,449 | Rubin | Mar. 18, 1947 |